Nov. 9, 1965    R. J. ROBBINS ETAL    3,216,513
CUTTER ASSEMBLIES FOR ROCK DRILLING
Filed Jan. 6, 1964    2 Sheets-Sheet 1

INVENTOR.
RICHARD J. ROBBINS
DOUGLAS F. WINBERG
BY Mattis & Graybeal
ATTORNEYS

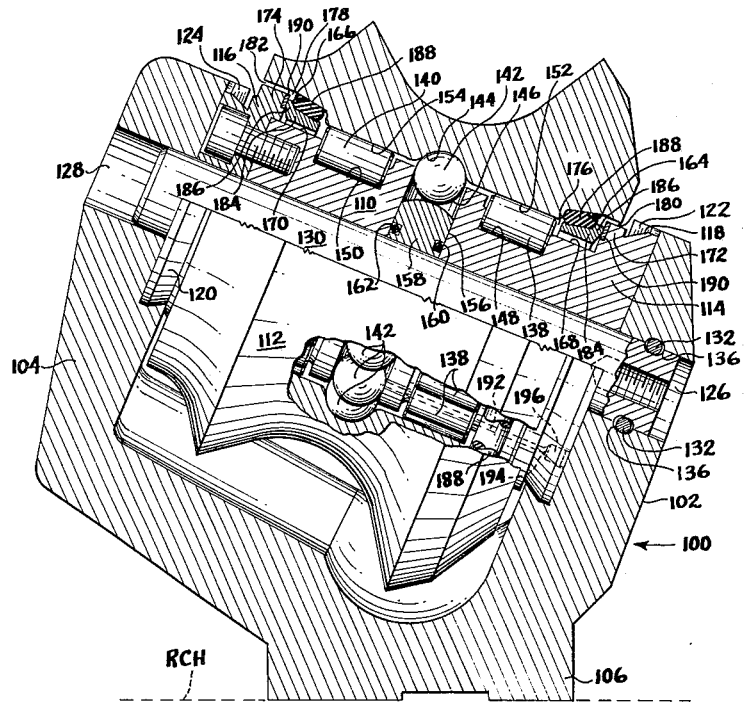

United States Patent Office 3,216,513
Patented Nov. 9, 1965

3,216,513
CUTTER ASSEMBLIES FOR ROCK DRILLING
Richard J. Robbins, Seattle, and Douglas F. Winberg, Bellevue, Wash., assignors to James S. Robbins and Associates, Inc., Seattle, Wash., a corporation of Washington
Filed Jan. 6, 1964, Ser. No. 335,882
12 Claims. (Cl. 175—227)

This application is a continuation-in-part of our co-pending application Serial No. 259,274, entitled Cutter for Rock Drilling Machine, and filed February 18, 1963, and now abandoned.

The present invention relates to earth boring equipment, and more particularly to rotary wheel type rock cutters, such as for use in tunnel boring and raise drilling operations, for example.

Cutters of the present invention comprise a rotary cutting wheel having a peripheral cutting portion, mounting means including anti-friction bearings on which the cutting wheel is freely rotatable, and resiliently cushioned, metal-to-metal seal means outboard of the bearings. More specifically, said mounting means includes a pair of end members situated axially outboard of and contiguous the end surfaces of the cutting wheel, with the end members each including a fixed (i.e. nonrotating) seal ring, and the rotary cutting wheel having a rotating seal ring at each end thereof, in sliding contact with the adjacent fixed seal ring. The fixed and rotary seal rings are preferably both maintained in floating, pressurized contact and together constitute seal means for effectively sealing the annular openings which would otherwise exist between the end surfaces of the rotary cutting wheel and the adjacent side surfaces of the stationary end members.

Experience has proven that, without effective sealing between the rotary and fixed components of the cutters, considerable ingress of cutting fines or "grit" occurs into the bearing area of the cutter assembly and the useful life span of the bearings is extremely short. This is because of impaction of grit during the boring operation and also because of lubricant leakage from the bearing area, which leaves the bearings dry and gritty. Continued operation under these conditions soon destroys the effectiveness and within a short time the cutting wheel "freezes" up and also becomes ineffective.

Accordingly, a principal object of the present invention is to provide effective seal means between the rotary cutting wheel and the stationary end portions of an earth boring cutter assembly, for preventing the leakage of lubricant out from and preventing ingress of grit into the bearing, and thereby greatly increase the useful life of the cutter assembly.

Another principal object of the present invention is to provide a resiliently cushioned, metal-to-metal seal between the rotary cutting wheel and the end members of the mounting means. In the forms here disclosed, said seal consists of a pair of fixed seal rings integral with or carried by the end members and a pair of complementary, rotary seal rings carried by the rotary cutting wheel. Both the fixed and rotary seal rings include a hardened, metallic seal face, and the metallic seal face of each rotary seal ring is in sliding contact with the metallic seal face of the related fixed seal ring. Preferably also, at least the rotary seal component of each seal is in the form of an annular ring of hardened metal, more wear resistant than file steel, such as Haynes Metal No. 93. Pressurized contact between the engaged sliding surfaces of the seal rings is suitably maintained by an oil resistant, resilient, rubber O-ring positioned between each rotary seal component and the rotary cutting wheel. The O-rings are substantially compressed and the stored up spring energy is advantageously used to urge the metallic seal faces of the rotary seal rings into tight engagement with the metallic seal faces of the fixed seal rings.

The O-rings also permit what may be termed a "floating action" of the engaged seal faces. For this reason, seals according to the present invention has the capability of accommodating much more end play and side thrust than other types of seals. Although substantial endwise movement of the rotary cutting wheel is prevented by the particular arrangement of bearings in the forms of cutter assemblies here disclosed, some end play still exists, and of course there is some side play. However, owing to the presence of and "floating action" of the O-rings, sealing is always positive despite the presence of the end play and/or side thrust.

Still another object of the present invention is to provide a cutter of the character described wherein the rotary cutting wheel comprises a replaceable outer annular cutting member, and an inner annular hub member around which the annular cutting member is press fitted or otherwise secured. Characteristically of this aspect of the invention, the configuration of a section taken through the annular cutting member is generally that of an isosceles triangle. The circular apex of the cutting member constitutes the cutting edge of the cutting wheel. A cutting wheel of this character is termed a "disk cutter." In use, the circumferential cutting edge of the cutting wheel bears against the rock and, by virtue of the rotary motion of the cutterhead on which it is mounted, rolls against and cuts a kerf in the rock face. When the annular cutter wears to the extent that it is no longer effective and needs to be replaced, it is removed from the annular hub and another cutter is installed in its place. Particularly with the longer useful operating life of the cutter wheel bearings, as provided by the seal means of the present invention, the useful life span of the hub portion of the cutter wheel is many times that of the annular cutter edge. The replaceable cutter edge thus results in a considerable saving in maintenance costs, as the replacement cost of the annular cutter is much less than the replacement cost of the cutter edge and hub together.

Other objects, features and advantages of the present invention include the provision of an earth boring cutter assembly which is sufficiently rugged to withstand heavy loading with the parts thereof being quickly and easily replaceable, i.e., easy to efficiently maintain.

These and other objects, features and advantages of the present invention will be apparent from the following description of typical and therefore non-limitive embodiments of cutter assemblies constructed according to the invention, taken together with the accompanying illustrations, wherein like letters and numerals refer to like parts, and wherein.

FIG. 3 is a view, partly in section and partly in elevation, of a modified form of cutter assembly characterizing the invention and especially adapted for use on the cutterhead of a raise drilling machine, the portion in section being taken substantially along line 3—3 of FIG. 4; and FIG. 4 is an elevational view of the cutter assembly of FIG. 3, taken substantially at right angles to the view of FIG. 3, toward one side of the rotary cutter of such cutter assembly.

Figure 1:
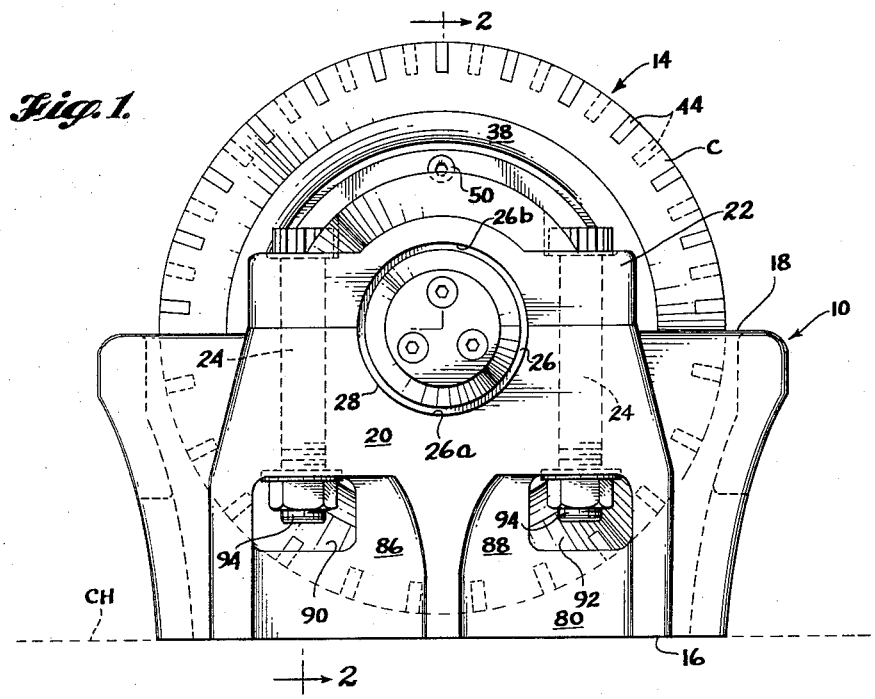
FIG. 1 is an end elevational view of a cutter assembly according to the invention that is especially adapted for use on the cutterhead of a tunnel boring machine, such view being taken toward one side of the rotary cutting wheel portion of said assembly.
Figure 2:
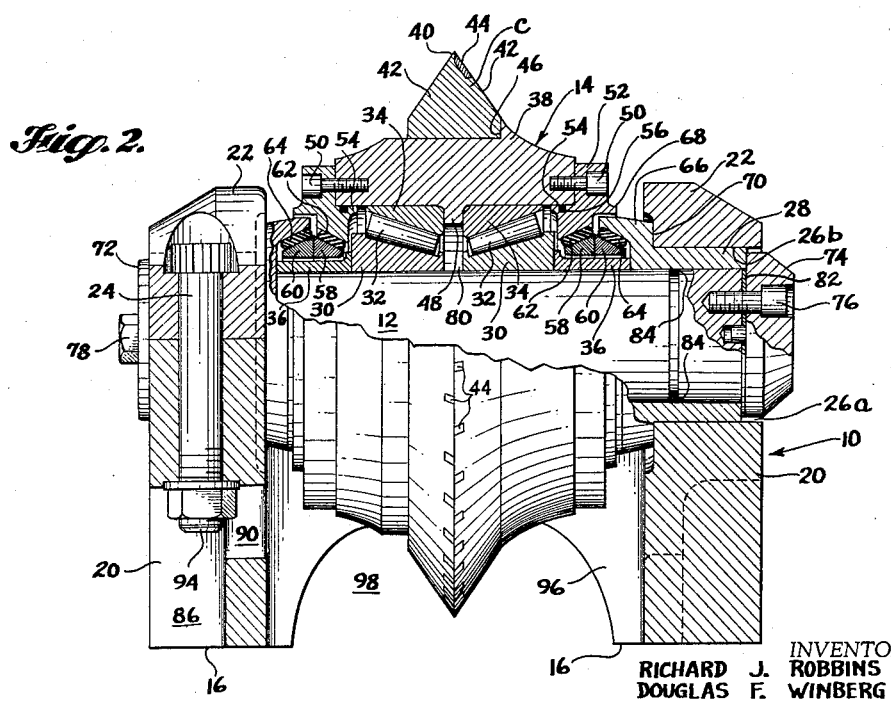
FIG. 2 is a view, partly in section and partly in elevation, taken at right angles to the view of FIG. 1, the portion in section being taken substantially along line 2—2 of FIG. 1.

FIGS. 1 and 2 illustrate a cutter assembly that is especially adapted for use on the cutterhead of a tunnel boring machine, such as the type disclosed in our copending application Serial No. 203,846, filed June 20, 1962, an entitled Head Structure for Rock Drilling Machine.

A tunnel boring machine of the type disclosed in application Serial No. 203,846 includes a large, generally circular cutter head having a front plate on which the cutters are mounted. The cutterhead also carries a plurality of outrigger bucket members which may be evenly spaced along the circumference of the cutterhead. Cutters may be mounted on the bucket members as well as on the front plate. As the cutterhead rotates, the bucket members follow a circular path and scoop up the rock and other debris cut from the end wall or face of the tunnel and carry it to the top of the machine. Here the bucket discharges the debris onto a rearwardly traveling conveyor which carries such debris to the rear of the tunnel boring machine.

The cutters consist of freely rotating annular wheels having peripheral cutting portions, preferably in the form of an annular wedge having a peripheral cutting edge forming apex. The axes of rotation of the cutting wheels preferably lie on radial lines extending outwardly from the axis of rotation of the cutterhead. The cutting wheels are preferably spaced both radially and circumferentially with respect to the axis of rotation of the cutterhead. As the tunnel boring machine moves forwardly, the cutting portions of the cutting wheels bear against and penetrate the face of the tunnel and, by virtue of the rotary portion of the cutterhead, cut circular kerfs therein. During the boring operation, the cutting wheels deepen their respective kerfs by chipping away the rock; the divergent side faces of the cutting wheels press in wedge-like fashion into the kerfs to fracture the rock. Since the cutting wheels are spaced circumferentially as well as radially with respect to one another, any one portion of rock between adjacent kerfs is pressed only by a single cutting wheel at any one time so that the fracturing action is exerted first from the kerf on one side of such rock portion and then from the kerf on the other side thereof. This causes pieces of rock to be separated from the face of the tunnel, these pieces then being scooped up by the buckets and dumped into the conveyor in the aforedescribed manner.

For a more extensive and comprehensive discussion and disclosure of a tunnel boring machine, reference is made to application Serial No. 203,846. To the extent that it may be necessary for a clear understanding of the present invention, the disclosure of application Serial No. 203,846 is expressly incorporated herein by reference.

Referring now to FIGS. 1 and 2, numeral 10 designates a mounting frame or pillow block which carries a fixed (i.e. non-rotating) shaft 12, on which is mounted for rotary motion thereabout a cutting wheel 14. The base or rear face of the mounting frame 10, by which it is welded, bolted, or otherwise secured to the large rotary cutterhead CH of the tunnel boring machine, is designated 16, while the forward face which is distal the base 16 and nearer the rock surface being cut, is designated 18. As previously mentioned, the axis of the shaft 12 lies on a radial line extending outwardly from the rotary axis of the cutterhead CH, so that the cutting wheel 14 is able to roll in a circular path against the rock face being cut so as to form its kerf in the manner above described.

The mounting frame 10 includes spaced apart end portions 20, each having at the forward end thereof a cap 22, secured thereto by two bolts 24. Each of the end portions 20 and the related caps 22 are formed with matching semi-circular cutouts, as 26a and 26b respectively, to form at a location between each pair of bolts 24 a circular through opening 26 to accommodate a related one of two mounting sleeves 28. Encircling the shaft 12 at the midlength thereof are two inner bearing races 30 for two sets of roller bearings 32, the outer bearing races 34 of which fit inside the freely rotating cutting wheel 14. Spacing sleeves 36 encircle the shaft 12 between each mounting sleeve 28 and its related inner bearing race 30, so as to keep the latter two members in proper spaced relationship. For clarity of description the terms "inner" and "outer" as used herein define proximity to the longitudinal axis of the shaft 12, while "inside" and "outside" define proximity to a transverse plane passing through the midlength of the shaft.

The rotary cutting wheel 14 comprises a replaceable outer annular cutter C, which performs the aforedescribed kerf cutting action, and an inner annular hub member 38 within which the outer bearing races 34 are placed, and around which the annular cutter C is press fitted, heat shrunk, or otherwise secured. The configuration of a section taken through the annular cutter C (FIG. 2) is generally that of an isosceles triangle with the apex 40 at which the two equal sides 42 of the triangle meet being the circumferential cutting edge of the cutting wheel 14. Embedded in the annular cutter and spaced at equal intervals alternately on each side of the cutting edge 40 are a plurality of relatively hard tooth members 44, which facilitate the kerf forming action of the cutter and improve cutter edge life.

The hub member 38 has projecting outwardly therefrom an annular portion defining a laterally facing shoulder 46 against which the annular cutter C is seated. At the inside center portion of the hub 38 and formed integrally therewith is an inwardly extending annular spacing member 48 on each side of which is located a related one of the two outer bearing races 34.

To seal within the cutting wheel 14 the lubricant for the roller bearings 32, there is screwed at 50 to each side of the hub 38 an annular keeper 52. The portion 54 of this keeper 52 which is nearest the mid-length of the shaft 12 has a circumeferential O-ring 56 which is pressed against the inner surface of the hub 38 so as to form a seal therewith.

Two metallic annular sealing rings 58 and 60 are placed side by side circumferentially about each of the spacing sleeves 36, there being a slight amount of clearance between each sleeve 36 and its related two rings 58 and 60. The outer surfaces of each set of adjacent sealing rings 58 and 60 are flared moderately away from one another, so that as each of two oil resistant, resilient rubber O-rings 62 and 64, respectively, are pressed each against the flared surface of its related sealing ring 58 or 60, these latter two rings are pressed together to form a seal therebetween. The inner surface of the keeper 52 is flared moderately away from the midlength of the shaft 12 so as to press the O-ring 62 against the inside sealing ring 58, while the mounting sleeve 28 has at its inside an annular lip 66 to press the O-ring 64 against the outside ring 60.

Each inside sealing ring 58 rotates with the cutting wheel 14, while each outside ring 60 remains stationary with its mounting sleeve 28. Thus there is sliding friction and a metal-to-metal, rotating-to-nonrotating seal along the transverse plane where these two sealing rings 58 and 60 meet, with the pressure between these two sealing rings 58, 60 being sufficient to prevent ingress of grit or leakage of lubricant therebetween. Each keeper 52 is also provided with an annular shoulder 68 which reaches a moderate distance over its related mounting sleeve 28 to prevent small pieces or rock from coming in contact with the sealing rings 58 and 60.

The seal rings 58 and 60 are fabricated from an extremely hard ferrous alloy material, more wear resistant than file steel, such as Haynes Metal No. 93, for example, and the seal faces thereof are finished as by grinding or lapping to a mirror-like surface for perfect sealing. Haynes Metal No. 93 is a high hardness alloy marketed by Haynes-Stellite Company, a Division of Union Carbide Corp., having a typical constituency of 3% C., 17% Cr, 16% Mb, 1.9% V, 6.25% Co, with the balance Fe. As will be apparent, any highly wear resistant material can be employed in the fabrication of the seal surfaces, as desired.

In a typical seal means design, about one hundred pounds (100 lbs.) of force or "load" is evenly exerted by the rubber O-rings 62 and 64 on their respective metal sealing rings 58 and 60, holding the seal faces so snug that lubricant cannot escape the bearing area and grit from the boring operation cannot seep into the bearing area.

The resilient O-rings also permit "floating action" of the seal faces in the event extended use develops some endwise movement of the cutter wheel. However, the cutter assemblies of the present invention preferably include means which prevent substantial endwise movement or end play of cutting wheel, at least when the assemblies are new. In the embodiments of FIGS. 1 and 2, substantial endwise movement of the cutting wheel 14 is prevented by inclining the two sets of rollers bearings 32 in opposite directions. By virtue of this arrangement each set of roller bearings can accommodate side thrust as well as performing its primary function of supporting the cutting wheel 14 for rotation about the fixed bearing races 30.

To properly secure the shaft 12 and the cutting wheel 14 in the mounting frame 10, each sleeve 28 is formed with an outside facing annular shoulder 70 which bears against the related inside surface defined by the mounting frame wall 20 and cap 22. To hold each mounting sleeve 28 on the shaft 12, there is, at each end thereof, one of two end caps 72 and 74, the former being integral with the shaft 12, and the latter being screwed to the shaft 12 as at 76. The end cap 72 is provided with a plug (the head of which is shown at 78), which closes a lubricating passage (not shown) in the shaft 12, which lubricating passage leads to the annular chamber 80 between the roller bearings 32. A shim 82 is provided between the end cap 74 and the shaft 12 to insure that the bearing force of the end cap is properly distributed between the adjacent sleeve 28 and the shaft 12, and to allow adjustment for end play. An O-ring seal, one of which is shown at 84 is provided between each of the sleeves 28 and the shaft 12.

The outside portion of each of the end walls 20 of the mounting frame 10 is recessed at 86 and 88 near the rear end of the cap securing bolts 24. At the forward end of these recesses 86 and 88 are provided through openings 90 and 92 to accommodate the rear threaded ends of the bolts 24. Reaching between proximate end portions of the walls 20 of mounting frame 10, so as to brace the same with respect to each other, are two web members 96 located each on an opposite side of the mounting frame 10. Each web member 96 is spaced from the base surface 16 of the mounting frame 10 so as to define with the face of the large rotating cutterhead CH of the boring machine a through opening 98. Thus, dust which would otherwise accumulate and rock which may become lodged between the cutting wheel 14 and the face plate of the machine's cutterhead CH has two side openings through which such material is able to pass.

In operation, the subassembly which freely rotates about the roller bearings 32 comprises the annular cutter C, and the hub 38, with the two keepers 52 and associated metal sealing rings 58 and O-rings 62. Each sealing ring 58 slides against its related nonrotating sealing ring 60, in turn loaded by its associated O-ring 64, so as to form seals between the rings 58, 60.

When any portion of the cutter assembly is worn or damaged, the tunnel boring machine is backed away a short distance from the end wall of the tunnel and a mechanic moves to a position forward of the rotary cutterhead CH. By removing the four bolts 24, he is able to detach the mounting frame caps 22 and remove the shaft 12, the mounting sleeves 28 and the cutting wheel 14 as a unit, and insert another such unit into the mounting frame cutout 26a. The damaged or worn unit can then be repaired at a more convenient location outside the tunnel.

FIGS. 3 and 4 illustrate a modified form of cutter assembly that is especially adapted for use on the cutterhead of a raise drilling machine, such as of the type disclosed in the copending application of Cannon et al., Serial No. 224,756, filed September 19, 1962, and entitled Raise Drilling Method and Mechanism.

Quite briefly, the raise drilling operation disclosed in said application involves first boring a small pilot hole from an upper level, where the drill driving mechanism is situated, down to a lower level. With the pilot hole formed, the pilot hole drill bit is removed from the drill stem at the lower level, and a raise cutterhead is connected to the lower end of the drill stem. The raise hole drilling operation is then accomplished by progressively rotating and lifting the drill stem and its depending raise cutterhead.

For more extensive and comprehensive discussion and disclosure of the raise drilling technique and the mechanism employed, reference is made to the aforementioned copending application Serial No. 224,756. To the extent that it may be necessary for a clearer understanding of the present invention, the disclosure of application Serial No. 224,756 is hereby expressly incorporated herein by reference.

In FIGS. 3 and 4, numeral 100 designates a mounting frame or saddle which includes a pair of spaced apart stanchions 102, 104 and a base 106 by which it is suitably secured to the upper surface of the raise cutterhead RCH, such as by bolts 108 (FIG. 4), for example. The stanchions 102, 104 mount a cutter unit comprising an inner or fixed bearing race 110 and an annular cutting wheel 112 mounted for rotation about the inner bearing race 110 by means to be hereinafter specifically described.

As in the cutterhead of the tunnel boring machine previously discussed, the raise cutterhead RCH mounts a plurality of cutter assemblies, and each cutter assembly is oriented in a manner such that the axis of rotation of its cutting wheel 112 is located on a line extending radially outwardly from the rotational axis of the raise cutterhead RCH so that each cutting wheel 112 is able to roll in a circular path against the rock face being cut.

The cutter assembly shown in FIGS. 3 and 4 also includes a pair of annular support members 114, 116, affixed to the opposite ends of the inner bearing race 110. Member 114 may be formed integral with bearing race 110 and member 116 may be a separate piece and screwed to bearing race 110, as illustrated. Such support members 114, 116 include outwardly flaring, frusto-conical portions or frustrums 118, 120, respectively. Stirrups 122, 124, open at the top and marginally configured to match the configuration of frustrums 118, 120, are cast or otherwise formed in the inner surfaces of the stanchions 102, 104, respectively. The open centers of annular support members 114, 116 and the open center of inner bearing race 110 together form an elongated cylindrical bore, extending axially through the cutter unit. When the frustrums 118, 120 are nested in or engaged by the stirrups 122, 124, the center bore of the cutter unit is in alignment with openings 126, 128, extending through the stanchions 102, 104, respectively. A large main pin or fixed shaft 130, inserted through opening 126, the center bore of the cutter unit, and opening 128, secures the cutter unit to the mounting saddle 100. The main pin 130 is locked in place by a retainer pin 132, in the form of a nail driven into opening 134 in stanchion 102, said retaining pin 132 when in seated position bending around the cut away portion 136 of main pin 130.

Removal of the center unit from the mounting saddle 100 is easily effected by the withdrawal of the retaining pin 132 by means of a claw hammer, wrecking bar, or the like. Next the main pin 130 is slid endwise and removed and the cutter unit is lifted up and out of engagement by the stirrups 122, 124, of the stanchions 102, 104.

The outer or rotary bearing race may be formed on the inner surface of the cutter wheel 112, as illustrated, or may be otherwise carried by the cutter wheel 112. Two sets of roller bearings 138, 140, and a single set of ball-bearings 142, encircle the inner bearing race 110. As shown in FIG. 3, the bearing race means for the ball bearings 142 consist of a semi-annular groove 144 formed in the inner surface of the cutter wheel 112 and a complementary semi-annular groove 146 formed in the outer surface of the fixed bearing race member 110. The bearing race means for the roller bearings 138, 140 consists of annular grooves 148, 150, respectively, formed in the outer surface of the fixed bearing race member 110, and cylindrical surfaces 152, 154 formed on the inner surface of the cutting wheel 112. As will be evident from an inspection of FIG. 3, inner race member 110, with support member 116 removed, and with roller bearings 152, 154 in place in the annular grooves 148, 150, respectively, can be inserted endwise into place within the open center of cutting wheel 112. The ball bearings 142 are inserted through a radial bore 156 and when the complete set of ball bearings 142 are in place the radial bore 156 is closed by means of a ball plug 158. Ball plug 158 is formed to include an annular groove 160 for the reception of an O-ring 162 of rubber or the like, serving to frictionally secure ball plug 158 in the radial bore 156 until the main pin 138 is put in place, and also serving as a seal to prevent the lubricant from leaking out around the ball plug 158. In the embodiments of FIGS. 3 and 4, the ball bearings 142 and the complementary semi-annular grooves 144, 146 constitute the means for preventing substantial endwise movement of the cutting wheel 112 relative to the fixed bearing race member 110.

As shown in FIG. 3, the inner surface of the cutting wheel 112 is recessed at the ends, at 164 and 166, axially outboard of the roller bearing 148, 150, respectively. The recessed portions 164, 166 form with the end surface portions 168, 170 of the bearing race member 110, and with the flange portions 172, 174 of the cutter support members 114, 116, respectively, a pair of annular seal chambers 176, 178. The grooved end portions 164, 166 of the cutting wheel 112 overhang the flange portions 172, 174 and form therewith a pair of axially and outwardly facing, relatively shallow annular gaps 180, 182, constituting the sole entrances from the outside into the annular seal chambers 176, 178. The smallness of the gaps 180, 182 prevents the ingress of all but the smallest rock chips or grit into the seal chambers 176, 178.

A metallic annular sealing ring 184, identical to either of sealing rings 58, 60 in the cutter assembly of FIGS. 1 and 2, is situated in each seal chamber 176, 178, with its radial flange portion 186 and metallic seal face directed outwardly. An oil resistant, resilient rubber O-ring 188, identical to either of O-rings 62, 64 in the cutter assembly of FIGS. 1 and 2, surrounds each sealing ring 184. The O-rings 188 are disposed between the sealing rings 184 and the adjacent grooved end portions 164, 166 of the cutting wheel 112. The O-rings 188 cushion the metallic sealing rings 184 and prevent leakage of lubricant from and ingress of grit into the seal chambers 176, 178, through the avenues existing between the sealing rings 184 and the grooved end portions 164, 166 of the cutting wheel 112. The sealing rings 184 and the O-rings 188 are fixed relative to cutting wheel 112 so as to rotate with it.

A fixed (i.e., nonrotating) annular seal component 190, constructed of hardened metal, preferably of the same metal as the associated seal ring 184, is affixed to or formed on the inside face of each flange portion 172, 174 of the support members 114, 116. The inside seal face of each seal component 190 is preferably flat and is in sliding, metal-to-metal contact with the seal face of the associated rotary seal component 184.

In FIG. 3, the portion of the cutting wheel 112 that is shown in elevation is in part cut away for clarity of illustration of a lubricant passageway 192 extending through the fixed bearing race member 110 from an inlet 194, formed in support member 114, to the semi-annular groove 146, in turn providing the inner bearing race for the ball bearings 142. A suitable high pressure grease type lubricant is delivered to the bearings through passageway 192 and then a plug 196 is screwed into the inlet opening 194. Some of the lubricant flows from the region of the ball bearings 142 axially outwardly in both directions and into the region of the roller bearings 138, 140. Of course, the lubricant can be supplied to the bearings 138, 140, 142 in any appropriate manner and by means other than that illustrated, the lubricant supply passageway 192 merely constituting a typical form in this respect.

In both embodiments of the invention as above discussed, a rotary disk type of cutter is illustrated. However, it is to be understood that the cutting portion of the cutting wheel can take various other forms, such as toothed cutters or tungsten carbide button insert type cutters, depending on the nature of the material being drilled or cut amongst other factors, and that the disk type cutters illustrated merely represent typical and therefore non-limitive forms of cutters with respect to which the principles of the present invention are applicable.

From the foregoing, further variations, modifications, adaptations and usages of cutter assemblies for rock boring will be apparent, within the scope of the following claims.

What is claimed is:

1. A rock boring cutter assembly comprising a rotary cutting wheel having an external surface configured to engage and break rock formations; mounting means for said cutting wheel including an integral frame recessed to snugly suround a portion of a side and the ends of said cutting wheel and having a base portion adapted to be mounted in fixed position on the rotary cutterhead of a rock boring machine with the recessed portion of the frame facing away from the surface of the cutterhead on which the frame is mounted, the said mounting means further including anti-friction bearing means supporting said cutting wheel for rotation and preventing endwise movement of said cutting wheel with respect to said frame; and resiliently cushioned metal-to-metal seal means between said cutting wheel and said mounting means for preventing the ingress of grit into said bearing means, said seal means comprising a fixed seal ring disposed on said mounting means and having a metallic seal face, a rotary seal ring disposed on said cutting wheel and having a metallic seal face in sliding contact with the metallic seal face of the fixed seal ring, and a compressed, resilient cushioning ring between said rotary seal ring and said cutting wheel, said cushioning ring exerting a pressure on said rotary seal ring, urging the metallic seal face thereof against the metallic seal face of the fixed seal ring, said cushioning ring also preventing the ingress of grit between the rotary seal ring and the rotary cutting wheel.

2. A cutter assembly according to claim 1, wherein the said anti-friction bearing means includes a set of ball bearings and the fixed and rotary bearing race means each include a circumferentially extending, substantially semi-annular groove, said grooves opposing each other and accommodating the ball bearings.

3. A cutter assembly according to claim 1, wherein said anti-friction bearing means comprises two sets of roller bearings, with the axes of rotation of the roller bearings of each set being inclined in the same direction, and with the direction of inclination of one set being opposite to the direction of inclination of the other set, and with the fixed and rotary bearing race means including surfaces that are inclined to correspond to the inclination of the roller bearings, such arrangement of the bearing race means and the bearing means preventing endwise movement of the rotary cutting wheel relative to the mounting means.

4. A rock boring cutter assembly comprising a rotary cutting wheel having an external surface configured to engage and break rock formations; mounting means for said cutting wheel including an integral frame recessed to snugly surround a portion of a side and the ends of said cutting wheel and having a base portion adapted to be mounted in fixed position on the rotary cutterhead of a rock boring machine with the recessed portion of the frame facing away from the surface of the cutterhead on which the frame is mounted, the said mounting means further including anti-friction bearing means supporting said cutting wheel for rotation and preventing endwise movement of said cutting wheel with respect to said frame; means lubricating said bearing means; and resiliently cushioned metal-to-metal seal means between said cutting wheel and said mounting means for preventing the leakage of lubricant out from and the ingress of grit into said bearing means, said seal means comprising a fixed seal ring carried by said mounting means and having a metallic seal face, a rotary seal ring carried by said cutting wheel and having a metallic seal face in sliding contact with the metallic seal face of the fixed seal ring, and a compressed, resilient cushioning ring between said rotary seal component and said cutting wheel, said cushioning ring exerting a pressure on said rotary seal ring urging the metallic seal face thereof against the metallic seal face of the fixed seal ring, and also preventing leakage of lubricant between the rotary seal ring and the rotary cutting wheel.

5. A rock boring cutter assembly comprising:
(a) a cutter wheel mounting frame recessed to snugly surround a portion of a side and the ends of a cutter wheel and having a base portion adapted to be mounted in fixed position on the rotary cutterhead of a rock boring machine with the recessed portion of the frame facing away from the surface of the cutterhead on which the frame is mounted, the said frame further comprising a removable fixed shaft and a fixed end member at one end of said fixed shaft;
(b) fixed bearing race means on said fixed shaft;
(c) a rotary cutter wheel arranged coaxially of and encircling said fixed shaft, and including inwardly facing rotary bearing race means and an outwardly facing work surface configured to engage and break rock formations;
(d) anti-friction bearings interposed between and engaged by said fixed and rotary bearing race means;
(e) seal means arranged between said rotary cutting wheel and said fixed end member, axially of said anti-friction bearings, said seal means including hardened metal ring means presenting a non-rotating flat metallic seal face on said fixed end member and hardened metal ring means axially recessed within and rotating with said cutter wheel and presenting a flat metallic seal face in sliding contact with the seal face on the fixed end member; and
(f) a resilient, rubber-like annular ring means in non-sliding compressed engagement with at least one of said metal ring means and axially urging the engaged metallic seal faces together.

6. A rock boring cutter assembly comprising:
(a) a cutter wheel mounting frame recessed to snugly surround a portion of a side and the ends of a cutter wheel and having a base portion adapted to be mounted in fixed position on the rotary cutterhead of a rock boring machine with the recessed portion of the frame facing away from the surface of the cutterhead on which the frame is mounted, the said frame further including a non-rotating shaft and axially spaced non-rotating end members rigidly mounting the ends of said non-rotating shaft;
(b) fixed bearing race means on said non-rotating shaft intermediate the ends thereof;
(c) a rotary cutter wheel arranged coaxially of and encircling said non-rotating shaft, and including inwardly facing rotary bearing race means and an outwardly facing work surface configured to engage and break rock formations;
(d) anti-friction bearings interposed between and engaged by said fixed and rotary bearing race means;
(e) seal means arranged between said rotary cutting wheel and said non-rotating end members on both sides of said bearings and bearing race means, said seal means including a hardened metal ring axially recessed within each end of and rotating with said cutter wheel, and each presenting a flat metallic seal face in sliding contact with a hardened metal ring presenting respective flat, non-rotating, axially inwardly facing, metallic seal faces on said fixed end members; and
(f) a resilient, rubber-like annular member in non-sliding compressed engagement with at least one of each such pair of engaged metal rings and urging the metallic seal faces thereof together.

7. The cutter assembly of claim 6, with the said cutter wheel being recessed at the ends thereof and configured to snugly overlap said end members with small annular gaps therebetween which face axially outward of the cutting wheel.

8. A rock boring cutter assembly comprising:
(a) a cutter wheel mounting frame recessed to snugly surround a portion of a side and the ends of a cutter wheel and having a base portion adapted to be mounted in fixed position on the rortary cutterhead of a rock boring machine with the recessed portion of the frame facing away from the surface of the cutterhead on which the frame is mounted, the said frame further comprising a removable fixed shaft and a fixed end member at one end of said fixed shaft;
(b) fixed bearing race means on said fixed shaft;
(c) a rotary cutter wheel arranged coaxially of and encircling said fixed shaft so as to rotate in said recessed portion of the mounting frame, and including inwardly facing rotary bearing race means and an outwardly facing work surface configured to engage and break rock formations;
(d) anti-friction bearings interposed between and engaged by said fixed and rotary bearing race means;
(e) seal means arranged between said rotary cutting wheel and said fixed end member, axially of said anti-friction bearings, said seal means including hardened metal ring means presenting a non-rotating flat metallic seal face on said fixed end member, and hardened metal ring means axially recessed within and rotating with said cutter wheel and presenting a flat metallic seal face in sliding contact with the seal face on the fixed end member; and
(f) a resilient, rubber-like annular ring means in non-sliding compressed engagement with at least one of said metal ring means and axially urging the engaged metallic seal faces together.

9. A cutter assembly according to claim 8, wherein said annular cutter includes a relatively wide face and slanted side surfaces, each sloping toward each other outwardly from the base to intersect and form a peripheral apex constituting the cutting edge of the cutter wheel.

10. A cutter assembly according to claim 8, wherein the cutter includes a plurality of circumferentially spaced, hardened metal inserts at the cutting edge.

11. In a rock boring machine having a generally circular cutterhead rotated about an axis of rotation and urged against the rock face to be bored, with a plurality of cutter assemblies mounted on said cutterhead at various radial and circumferential distances with respect to such axis of rotation, and with said cutter assemblies each comprising a cutter wheel arranged to rotate about an axis of rotation oriented substantially radially of the cutterhead axis of rotation and having an exterior surface configured to engage and break rock formations; the improvement wherein each such cutter assembly comprises:

(a) an integral mounting frame recessed to snugly surround a cutter wheel along one side and the ends thereof and having a base portion rigidly secured to said cutterhead with the recessed portion of the frame facing away from the surface of the cutterhead on which the frame is mounted;

(b) a fixed shaft removably supported on said mounting frame;

(c) fixed bearing race means on said fixed shaft intermediate the ends thereof;

(d) anti-friction bearing means supporting said cutting wheel on said shaft and preventing endwise movement of the wheel with respect to the shaft; and (e) resiliently cushioned metal-to-metal seal means between said cutting wheel and said mounting means for preventing the ingress of grit into said bearing means, said seal means comprising a non-rotary seal ring carried by said mounting means and having a metallic seal face, a rotary seal ring carried by said cutting wheel and having a metallic seal face in sliding contact with the metallic seal face of the non-rotary seal ring, and a compressed, resilient, cushioning ring between said rotary seal component and said cutting wheel, said cushioning ring exerting an axial pressure on said rotary seal ring urging the metallic seal face thereof against the metallic seal face of the non-rotary seal ring.

12. The combination of claim 11, further comprising a lubricating medium retained around said anti-friction bearing means by said resiliently cushioned metal-to-metal seal means.

References Cited by the Examiner
UNITED STATES PATENTS

| | | | |
|---|---|---|---|
| 1,516,340 | 11/24 | Holdaway et al. | 175—375 X |
| 1,634,318 | 7/27 | Bull | 175—227 |
| 1,884,965 | 10/32 | Baggett et al. | 308—8.2 |
| 1,993,268 | 3/35 | Ferguson | 277—92 X |
| 2,797,067 | 6/57 | Fisher | 175—372 X |
| 3,073,657 | 1/63 | Oxford | 308—187.1 |
| 3,151,691 | 10/64 | Goodwin | 175—228 X |
| 3,180,648 | 4/65 | Kupfert et al. | 277—92 |

CHARLES E. O'CONNELL, *Primary Examiner.*